US008337944B2

(12) United States Patent
Brush et al.

(10) Patent No.: US 8,337,944 B2
(45) Date of Patent: Dec. 25, 2012

(54) COMPOSITE MULTILAYER SEAL FOR PEM FUEL CELL APPLICATIONS AND METHOD FOR CONSTRUCTING THE SAME

(75) Inventors: Ronald W. Brush, Ringwood, NJ (US); John Carmelo Basta, Victor, NY (US); Crisanto F. del Rosario, Demarest, NJ (US)

(73) Assignee: Ames Rubber Corporation, Hamburg, NJ (US)

( * ) Notice: Subject to any disclaimer, the term of this patent is extended or adjusted under 35 U.S.C. 154(b) by 954 days.

(21) Appl. No.: 12/248,038

(22) Filed: Oct. 8, 2008

(65) Prior Publication Data

US 2009/0092886 A1 Apr. 9, 2009

Related U.S. Application Data

(60) Provisional application No. 60/978,381, filed on Oct. 8, 2007.

(51) Int. Cl.
*B05D 5/10* (2006.01)
*H01M 2/08* (2006.01)
(52) U.S. Cl. ........................................ 427/115; 429/509
(58) Field of Classification Search .................. 429/469, 429/509, 510; 427/115
See application file for complete search history.

(56) References Cited

U.S. PATENT DOCUMENTS

| | | | |
|---|---|---|---|
| 5,284,718 A | 2/1994 | Chow et al. | |
| 6,153,326 A | 11/2000 | Matsukawa et al. | |
| 6,410,630 B1 | 6/2002 | Hoover et al. | |
| 6,447,916 B1 | 9/2002 | Van Gool | |
| 6,481,995 B2 | 11/2002 | Delrosario et al. | |
| 6,660,422 B2 * | 12/2003 | Krasij et al. | 429/509 X |
| 6,743,542 B2 | 6/2004 | Krasij et al. | |
| 6,777,127 B2 | 8/2004 | Einhart et al. | |
| 7,344,796 B2 * | 3/2008 | Yuan et al. | 429/509 |
| 2002/0119362 A1 | 8/2002 | Chen et al. | |
| 2007/0141436 A1 | 6/2007 | Mekala et al. | |
| 2007/0166479 A1 | 7/2007 | Drake et al. | |
| 2008/0032179 A1 * | 2/2008 | Song et al. | 429/35 |
| 2008/0145712 A1 * | 6/2008 | Pierpont et al. | 429/12 |

OTHER PUBLICATIONS

International Search Report dated Jan. 2, 2009.

* cited by examiner

*Primary Examiner* — Stephen J. Kalafut
(74) *Attorney, Agent, or Firm* — Lowenstein Sandler PC (57) ABSTRACT

A composite seal having a multilayer elastomeric construction and method for constructing the same is provided. More specifically, the present invention provides a composite seal comprised of a low-durometer elastomer compliant layer coated with, or alternatively encapsulated by, a thin protective layer for securely sealing a bipolar plate and a membrane electrode assembly of a fuel cell. The elastomer compliant layer is preferably a silicone constituent and the thin coat protective layer is preferably a fluoroelastomer or fluoropolymer constituent suitable for bonding to the elastomer compliant layer. The foregoing layers constructing the composite seal are preferably deposited directly onto the aforementioned fuel cell components along a predetermined periphery. The resulting composite seal is thin in construction, resistive to undesired chemical and thermal reactions and provides the necessary compressive compliance without undue stress on the fuel cell assembly.

7 Claims, 6 Drawing Sheets

COMPOSITE MULTILAYER SEAL FOR PEM FUEL CELL APPLICATIONS AND METHOD FOR CONSTRUCTING THE SAME

CROSS-REFERENCE TO RELATED APPLICATIONS

This application claims priority to U.S. Provisional Patent Application No. 60/978,381, filed Oct. 8, 2007, the subject matter of which is incorporated by reference herein in its entirety.

BACKGROUND OF THE INVENTION

1. Field of the Invention

The present invention relates generally to seals for use in fuel cell applications. More particularly, the present invention relates to a composite seal comprising a multiple layer elastomeric construction for providing superior sealing performance and durability in proton exchange membrane (PEM) fuel cell applications.

2. Description of the Prior Art

A PEM fuel cell is assembled from multiple component layers, the essential component layers including a reactive membrane and a plurality of gas diffusion layers (GDL) making up the membrane electrode assembly (MEA) and opposing bipolar plates (one for enclosing the anode side and another for enclosing the cathode side of the cell). The MEA is interposed between the anode and cathode bipolar plates. Additional components may be used to help draw hydrogen fuel and oxygen gas into the fuel cell assembly and to conduct the electrical current generated by their corresponding interaction.

The use of PEM fuel cells as a means for generating electrical current is achieved through a controlled electrochemical reaction, driven by the MEA, between the hydrogen fuel and oxygen gas. More specifically, hydrogen is permitted to flow into the fuel cell on the anode side and is catalytically split into hydrogen ions (i.e., protons) and electrons. The ions permeate across the MEA to the cathode side, while the freed electrons flow through an external circuit coupled to the anode and cathode sides of the fuel cell to drive a load. As the hydrogen ions permeate through the MEA, oxygen is permitted to flow on the cathode side to combine with the electrons traversing the circuit load and the hydrogen ions permeating through the MEA. The recombination of these elements results in the formation of water and heat.

To ensure proper containment of the aforementioned electrochemical reaction, various gasket constructions are used to seal the periphery of the MEA interposed between anode and cathode bipolar plates. Many of these gasket constructions are known to utilize silicone based elastomers. Whereas silicone based elastomers are typically used in low temperature (i.e., less than 180° C.) fuel cell applications, their use in high temperature fuel cell applications is problematic due to their vulnerability to deterioration over time and subsequent interaction with a fluorene constituent, as well as the high pH values, commonly associated within a fuel cell environment. The use of silicone in low temperature fuel cell applications can be problematic as well in that its use in low temperature fuel cell applications has the potential for long term permeation of low molecular weight gases and materials through the silicone body due to its inherently porous molecular structure. Despite the foregoing, silicone remains the current standard even though in some cases it may not be the preferred sealing material.

Fluoroelastomer fluoropolymers, having a more resilient structure, are preferred for sealing applications. Fluoro materials, however, generally do not possess durometer values less than 55 Shore A, which presents an additional problem with respect to providing the necessary compliance for sealing anode and cathode bipolar plates to an adjoining MEA without resulting in undue stress on components of the fuel cell assembly. This is particularly a concern when dealing with bipolar plates comprised of inherently brittle graphite constructions.

Accordingly, it is desirable to provide an improved sealing solution, said sealing solution providing the necessary chemical and thermal resistance properties, as well as the necessary compressive compliance properties, needed for use in both low and high temperature yielding fuel cell applications. In addition to providing a resilient and structurally compliant sealing solution, it is also desirable to minimize misalignment or sealing vulnerabilities commonly associated with loose die-cut or free molded gaskets by providing a more integral sealing solution.

SUMMARY OF THE INVENTION

The present invention proposes a novel composite seal suitable for use in fuel cell applications having a wide array (low and high) of temperature yields. The composite seal of the present invention is comprised of a multiple layer elastomeric construction having an elastomer compliant layer, which may serve as a core or base layer that is encapsulated or coated, respectively, by a thin protective layer. These proposed composite multilayer constructions provide a significant improvement over existing sealing applications.

In an encapsulated embodiment of the present invention, the protective layer is disposed directly onto a peripheral surface of the bipolar plate, the MEA, the GDL or a combination thereof. After curing the protective layer, the elastomer compliant layer is disposed thereon and cured. To complete the encapsulation process, which has the elastomer compliant layer serving as the core layer, a final disposition of the protective layer is applied over the elastomer compliant layer and cured. Alternatively, in a non-encapsulated embodiment of the present invention, the elastomer compliant layer is first disposed directly onto a peripheral surface of the bipolar plate, the MEA, the GDL or a combination thereof. After curing, the elastomer compliant layer is coated with the protective layer and then subjected to a final curing stage.

When applying the foregoing layers, the elastomer compliant layer is preferably liquid deposited directly onto a metal, graphite or polymer substrate (e.g., along the periphery of the graphite bipolar plate, the MEA, the GDL or a combination thereof) or, alternatively, over the protective layer previously disposed on the substrate, to minimize sources of leakage common to that of traditional die-cut or molded gaskets. The direct deposit application onto the substrate additionally helps in minimizing the overall thickness of the composite seal. The deposition of the aforementioned layers may be provided by spray, offset transfer via a brush or roller, or by direct metering to the surface in a controlled volumetric manner, including molding.

The elastomer compliant layer is preferably a low-durometer elastomer, such as a silicone-based or fluorosilicone-based constituent. The protective layer is preferably a fluoroelastomer (i.e., Viton, Fluorel, Dai-el, Aflas, Technoflon, etc.) or fluoropolymer (i.e., Poly Tetra Fluoro Ethylene (PTFE), Per Fluor Alkoxy (PFA), Fluoro Ethylene Propylene (FEP), etc.) or any other suitable combination of fluoroelastomers or fluoropolymers suitable for adhesion to the low durometer elastomer compliant layer or aforementioned corresponding fuel cell component surfaces. The thin coat protective layer provides the necessary chemical and thermal resistance needed to withstand the active internal environment of the fuel cell that would be detrimental to the functionality of the elastomer compliant layer, while the wide low-durometer range of the elastomer compliant layer serves to provide the required compressive compliance needed for effective sealing of the fuel cell component layers.

BRIEF DESCRIPTION OF THE DRAWINGS

The above and other objects and advantages of the present invention will become apparent upon consideration of the following detailed description, taken in conjunction with the accompanying drawings, in which like reference characters refer to like parts throughout, and in which.

DETAILED DESCRIPTION OF THE PREFERRED EMBODIMENTS

The present invention is directed at a novel composite multilayer seal for PEM fuel cell applications. For purposes of clarity, and not by way of limitation, illustrative views of the novel composite multilayer seal and methods for constructing the same are described with reference to the aforementioned accompanying drawings.

Figure 1:
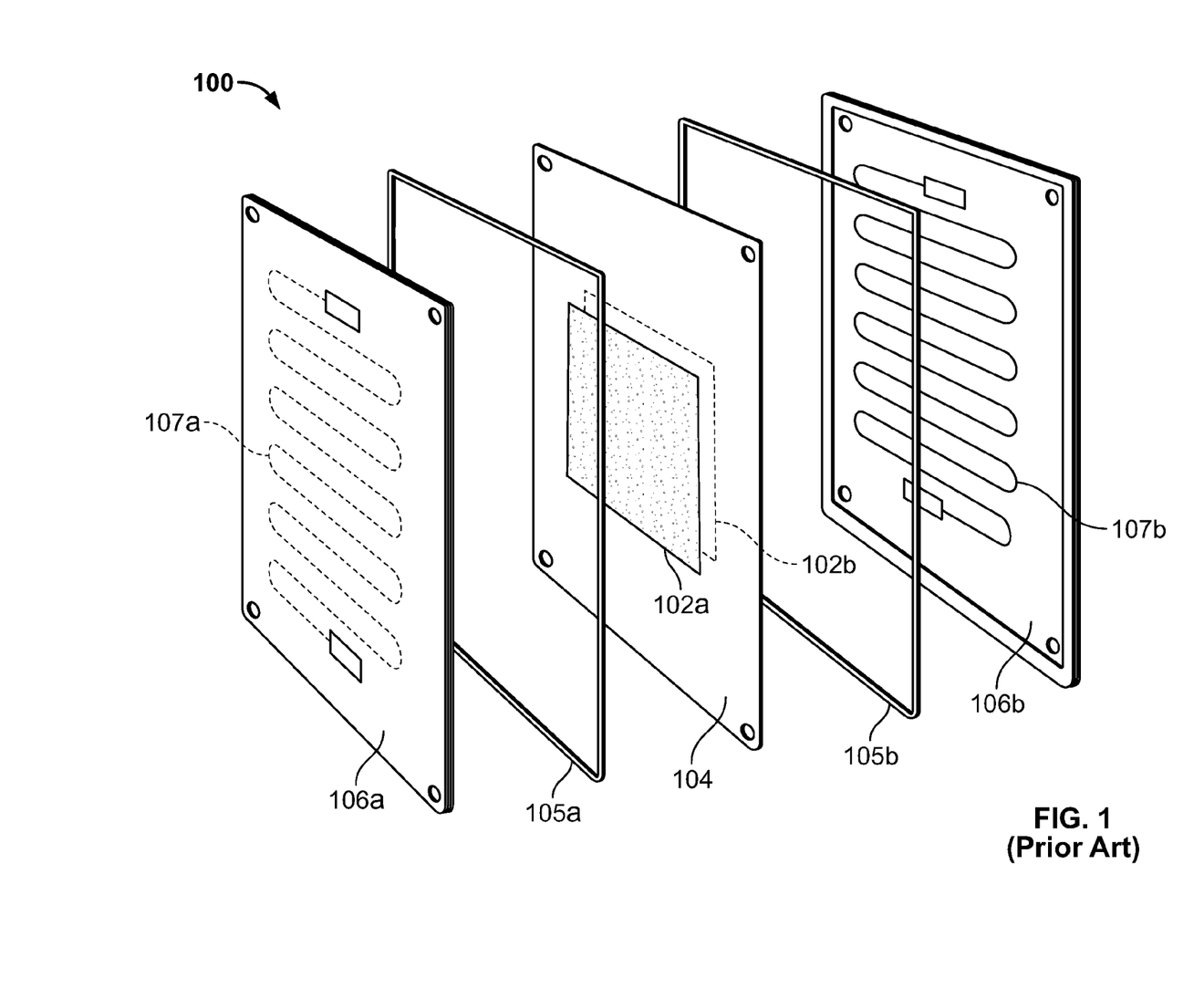
FIG. 1 is a disassembled view of known PEM fuel cell arrangements.

In FIG. 1, a disassembled view of a known fuel cell arrangement 100 is provided. Fuel cell arrangement 100 is comprised of a PEM (not shown) at its core for conducting only positively charged ions. The PEM is fixed between a pair of catalysts, wherein a first catalyst is provided on one side of the PEM core for facilitating an anode reaction (i.e., $H_2 \rightarrow 2H^+ + 2e^-$) and a second catalyst is fixed on an opposing side of the PEM core for facilitating the cathode reaction (i.e., $O_2 + 4e^- + 4H^+ \rightarrow 2H_2O$). The most common catalyst employed in the construction of PEM fuel cells is platinum powder or nanoparticles. Platinum is thinly coated onto a single side of a porous backing, such as carbon cloths (or paper) 102a and 102b, wherein the platinum-coated sides of carbon cloths 102a and 102b are positioned in a direction facing the PEM core. Platinum-coated carbon cloths 102a and 102b are commonly referred to as the electrode catalyst layers, wherein platinum-coated carbon cloth 102a drives the anode (i.e., negative) side of the reaction and platinum-coated carbon cloth 102b drives the cathode (i.e., positive) side of the reaction. The PEM core and electrode catalyst layers seated on opposing sides of the PEM core are collectively referred to as a membrane electrode assembly (MEA) 104.

MEA 104 is enclosed between two bipolar plates. A bipolar plate 106a is provided on the anode side, for equally dispersing hydrogen fuel via etched channel 107a, and a bipolar plate 106b, for equally dispersing oxygen gas via etched channel 107b, is provided on the cathode side of fuel cell arrangement 100. Etched channels 107a and 107b are commonly referred to as flow fields. Bipolar plates 106a and 106b are typically constructed of a lightweight, gas-impermeable, electron-conductive material (e.g., graphite) that may be coupled to drive a load (not shown).

Affixed between the anode side of MEA 104 and corresponding bipolar plate 106a and the cathode side of MEA 104 and corresponding bipolar plate 106b are, respectively, gaskets 105a and 105b. Gaskets 105a and 105b provide a means for sealing the hydrogen fuel and oxygen gas being dispersed within the confines of fuel cell arrangement 100. However, gaskets 105a and 105b are prone to a reduction in physical performance due to chemical and thermal aging, which tends to reduce the ability to provide adequate sealing and necessary compressive Compliance. Additionally, the introduction of constituents from within the chemical makeup of these gaskets has the potential to poison the functionality of the internal PEM fuel cell components. Each of these vulnerabilities take away from the efficiency of the cell and, in some cases, can render the cell completely inadequate for its intended purpose. As the efficiency and power output of fuel cells becomes a more viable source for alternative energy, these die-cut or molded gaskets are proving to be unreliable sealing solutions and, in many cases, actually constrain the development of more advanced PEM fuel cell stacks.

Figure 2:
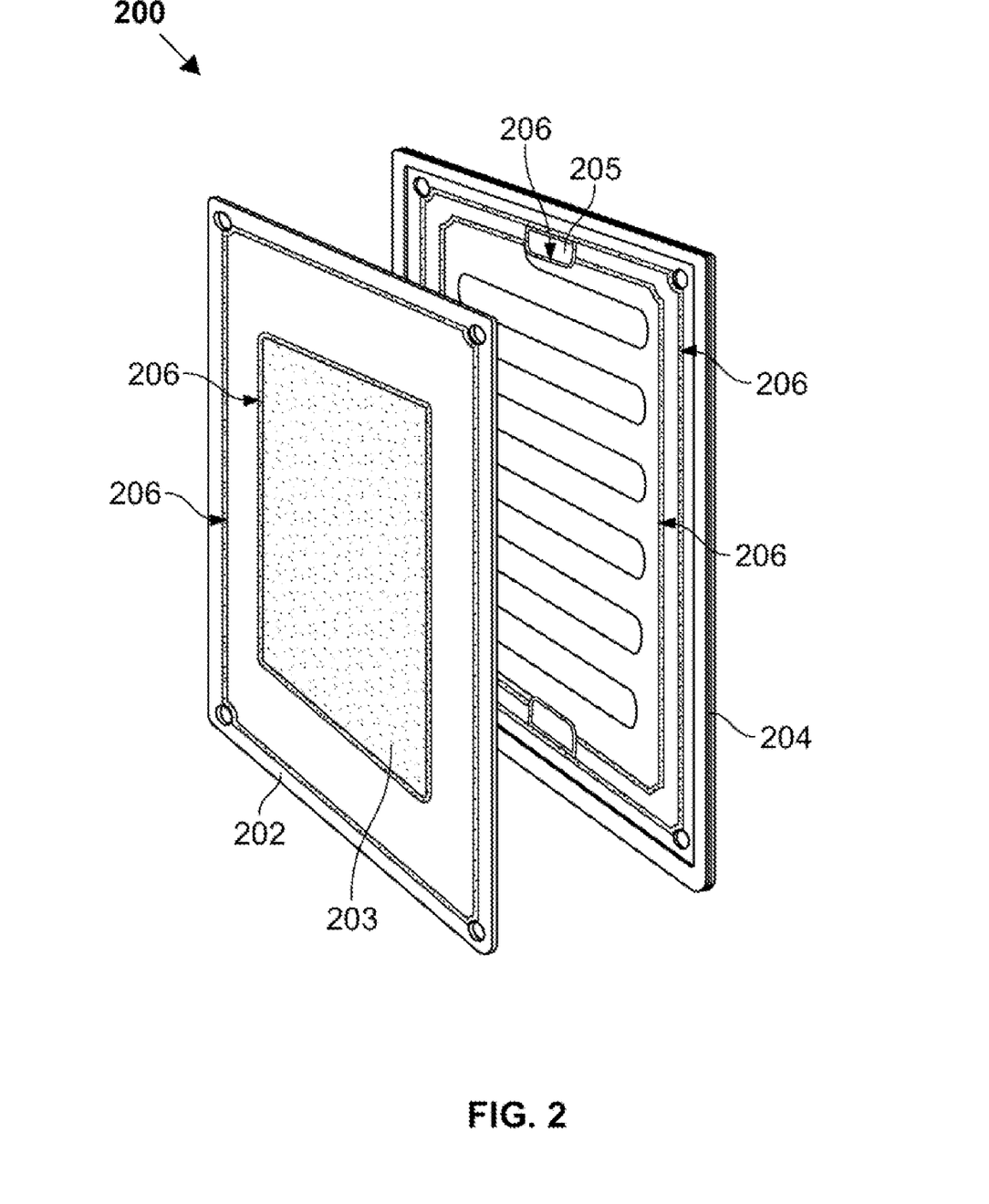
FIG. 2 is a partial disassembled view of a PEM fuel cell arrangement, particularly the membrane electrode assembly (MEA) and a bipolar plate of a PEM fuel cell, and a composite seal provided along the periphery of the bipolar plate and MEA in accordance with preferred embodiments of the present invention

The present invention proposes a more resilient, yet adaptable, sealing solution. Referring to FIG. 2, a partial view of a fuel cell arrangement 200 is illustrated. In fuel cell arrangement 200, an MEA 202 and a bipolar plate 204 are provided. Rather than layering traditional die-cut or molded gasket between multiple fuel cell layers, as depicted in fuel cell arrangement 100 of FIG. 1, the present invention proposes the use of a novel gasket construction that can be directly deposited to the primary components of a fuel cell arrangement. Applied along the periphery of bipolar plate 204, MEA 202, GDL 203 or, alternatively, a combination thereof (depending on varying sealing solution needs) is a composite seal 206. For purposes of brevity and illustration, and not by way of limitation, the forthcoming description primarily describes the application of composite seal 206 with respect to bipolar plate 204. One with skill in the art, however, will understand that the nature of composite seal 206, the preferred embodiments of which are described in detail herein, is equally applicable to the peripheral surface of other essential fuel cell component parts, as illustrated in FIG. 2.

Composite seal 206 may be deposited directly along the periphery of bipolar plate 204 in any suitable configuration to accommodate for various sizes, flow field designs and fuel or gas feed openings in bipolar plate 204. For example, in FIG. 2 an opening 205 is provided. When applying composite seal 206 onto bipolar plate 204, a pre-defined application operation best suited for this particular design of bipolar plate 204 may be deployed. In the representative embodiment provided in FIG. 2, composite seal 206 is provided along the outer and inner periphery of bipolar plate 204, as well as around opening 205 to ensure secure receipt and containment of, for example, hydrogen fuel or oxygen gas. Alternatively, as previously described, composite seal 206 can be placed directly on the surface of MEA 202, either at its outer periphery or at the periphery interface with GDL 203 as illustrated in FIG. 2. These alternative applications of composite seal 206 can serve to further isolate the cell system environment and eliminate, or significantly reduce, the need for a large section of the polymer portion of the membrane to extend beyond the active surface area of GDL 203. By eliminating the need for a die-cut or molded gasket and, instead, employing the use of composite seal 206 directly along the periphery of bipolar plate 204, or any other of the aforementioned component parts, possible sources of leakage common with traditional gaskets are significantly reduced and an improved assembly technique is facilitated.

Figures 3A, 3B:
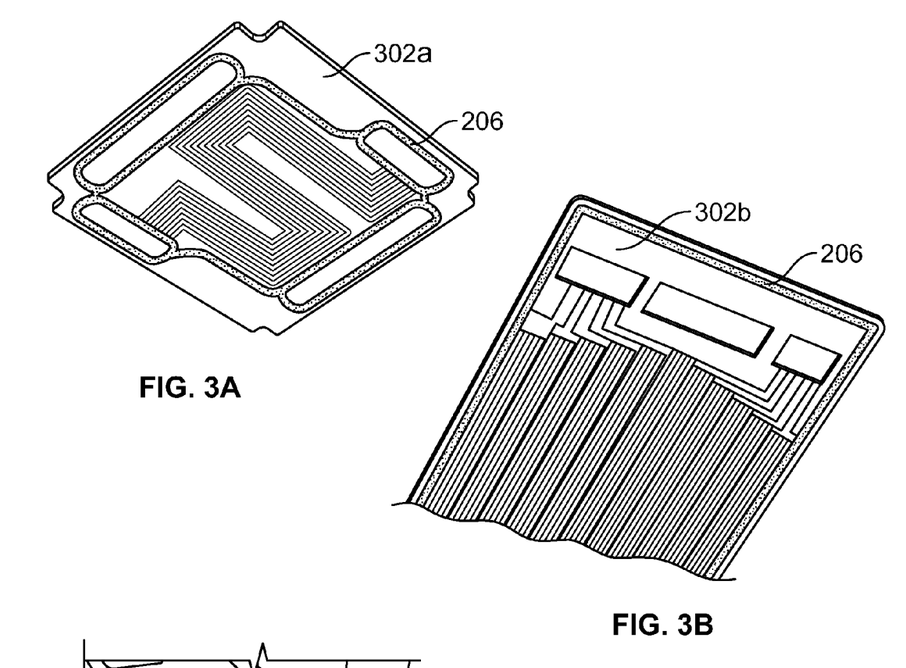
FIGS. 3A-3C illustrate a variety of bipolar plates for use in PEM fuel cell applications having the composite seal deposited thereon in accordance with preferred embodiments of the present invention.
Figure 3C:
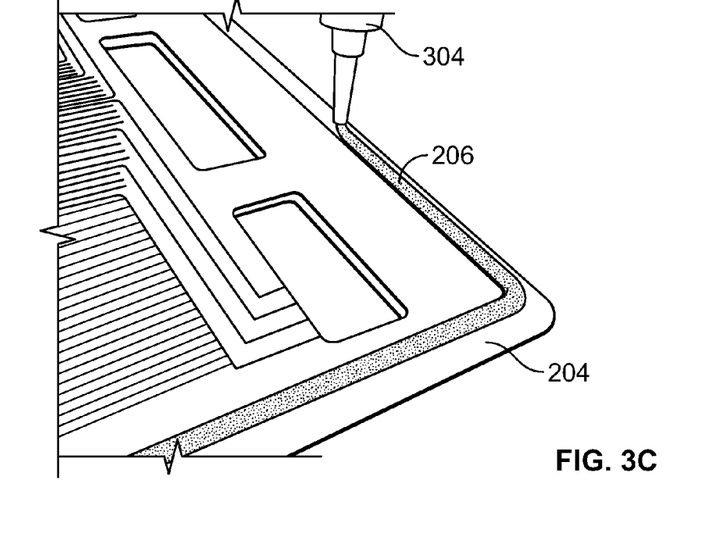

The use of various bipolar plate designs 302a and 302b, as illustrated in FIGS. 3A and 3B, are expected as technological advances are made in PEM fuel cell applications. In view of the plurality of design parameters that are anticipated, an adaptable application process is proposed for directly depositing composite seal 206 along the periphery, or any alternate configuration, of bipolar plate 204 or MEA 202. In a preferred embodiment of the present invention, as illustrated in FIG. 3C, an applicator 304 controlled, for example, by a corresponding programmable liquid delivery system (not shown) may be employed for precise application of any suitable constituent of composite seal 206 onto bipolar plate 204. This controlled delivery can be deployed via a direct contact method, such as brushing, wheel or pad transfer, or by atomization of the disposed liquid solution.

Figure 4A:
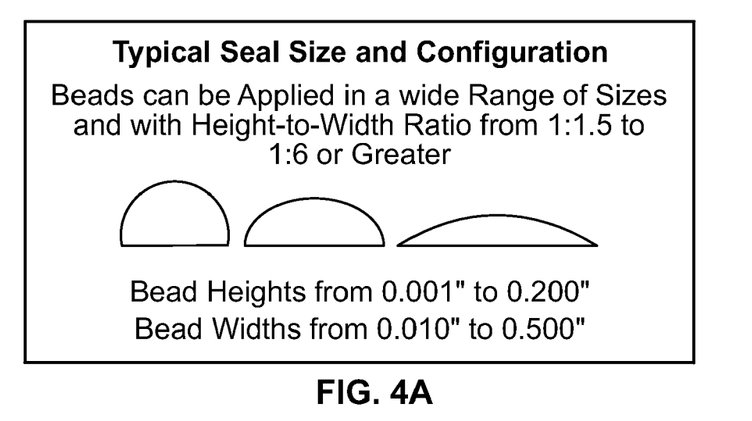
FIGS. 4A-4C illustrate, respectively, various bead sizes and configurations, a cross-sectional view of a non-encapsulated multilayer elastomer construction of the composite seal along a periphery of a bipolar plate and an encapsulated multilayer elastomer construction of the composite seal along a periphery of a bipolar plate in accordance with preferred embodiments of the present invention.

Composite seal 206, as referenced in FIG. 2 and FIGS. 3A-3C, is a multiple layer elastomeric construction, wherein its primary constituents may be deposited on bipolar plate 204 or MEA 202 in a plurality of bead sizes, numbers and configurations, as illustrated in FIG. 4A, to accommodate a plurality of bipolar plate and MEA applications and designs. Bead widths and heights of composite seal 206 are carefully determined, based in part on particular bipolar plate designs, construction and proposed applications, to provide a highly desirable thin and durable seal. Bead width and height of composite seal 206 may be applied in a wide range of sizes and height-to-width ratios. A plurality of height-to-width ratios, including a listing of corresponding bead heights and widths, are provided in FIG. 4A.

Figure 4B:
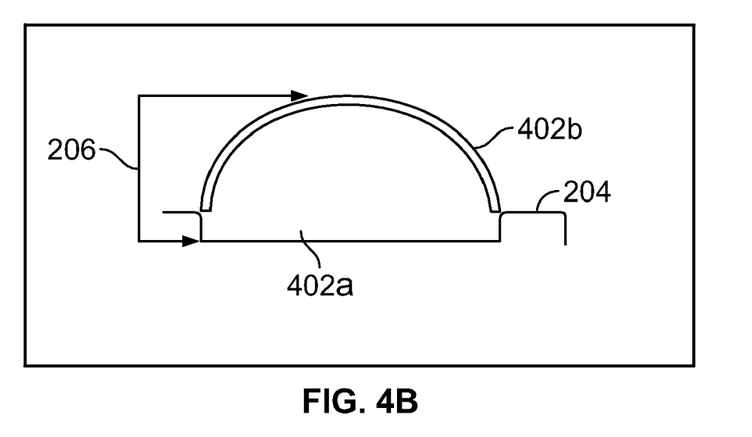
Figure 4C:
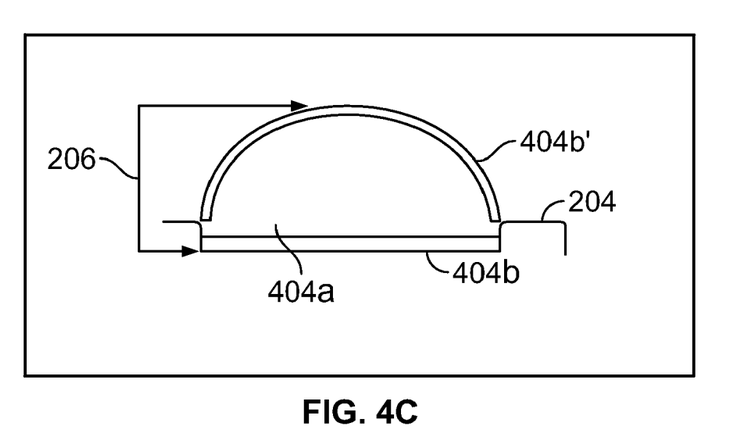

A cross-sectional view of composite seal 206, as applied along the periphery of bipolar plate 204, is illustrated in FIGS. 4B and 4C. A non-encapsulated application of composite seal 206 is illustrated in FIG. 4B, wherein the multiple layer elastomeric construction of composite seal 206 is comprised of a silicone base layer 402a and a thin fluoroelastomer protective layer 402b overlaid thereon. An encapsulated application of composite seal 206 is illustrated in FIG. 4C, wherein the multiple layer elastomeric construction of composite seal 206 is comprised of a silicone core layer 404a having a thin fluoroelastomer/fluoropolymer protective layer 404b underlying and a thin fluoroelastomer/fluoropolymer protective layer 404b' overlaying the surface of silicone core layer 404a. The hardness of silicone layers 402a and 404a and protective layers 402b and 404b/404b' may range, respectively, between 15 to 65 Shore A and 50 to 80 Shore A. The thickness of protective layer 402b and 404b/404b' may range between 10 and 100 microns.

In accordance with the non-encapsulated embodiment illustrated in FIG. 4B, silicone base layer 402a is first dispensed and cured along the periphery, or any alternate configuration desired, of bipolar plate 204. Silicone base layer 402a may be comprised of a dimethyl, phenyl or blended combination thereof. Dimethyl and phenyl are preferred due to their wide range of viscosities, inherent stability and chemical resistance. Thereafter, fluoroelastomer/fluoropolymer protective layer 402b is bonded and cured to silicone base layer 402a to form composite seal 206. Alternatively, in the encapsulated embodiment illustrated in FIG. 4C, a thin fluoroelastomer/fluoropolymer protective layer 404b is first dispensed and cured along the periphery, or any alternate configuration desired, of bipolar plate 204. Silicone core layer 404a is then deposited and cured over protective layer 404b and coated with a second fluoroelastomer/fluoropolymer protective layer 404b', completely encapsulating silicone core layer 404a. Similar to the composite multilayer construction described in connection with the non-encapsulated embodiment, this alternate embodiment also provides for the same improved resiliency and compressive compliance attributes when compared to that of traditional die-cut and molded gasket constructions.

Fluoroelastomer/fluoropolymer protective layer 402b acts as a durable, yet flexible, barrier when coated over silicone base layer 402a or encapsulated about silicone core layer 404a, significantly reducing undesired chemical reactions resulting in dissolution of the silicone constituent, which is commonly employed in the construction of a die-cut or molded gasket. Accordingly, composite seal 206, when formed, combines the benefits of both a, low-cost, low-durometer silicone with the improved sealing and durability of a fluoroelastomer/fluoropolymer.

Figure 5A:
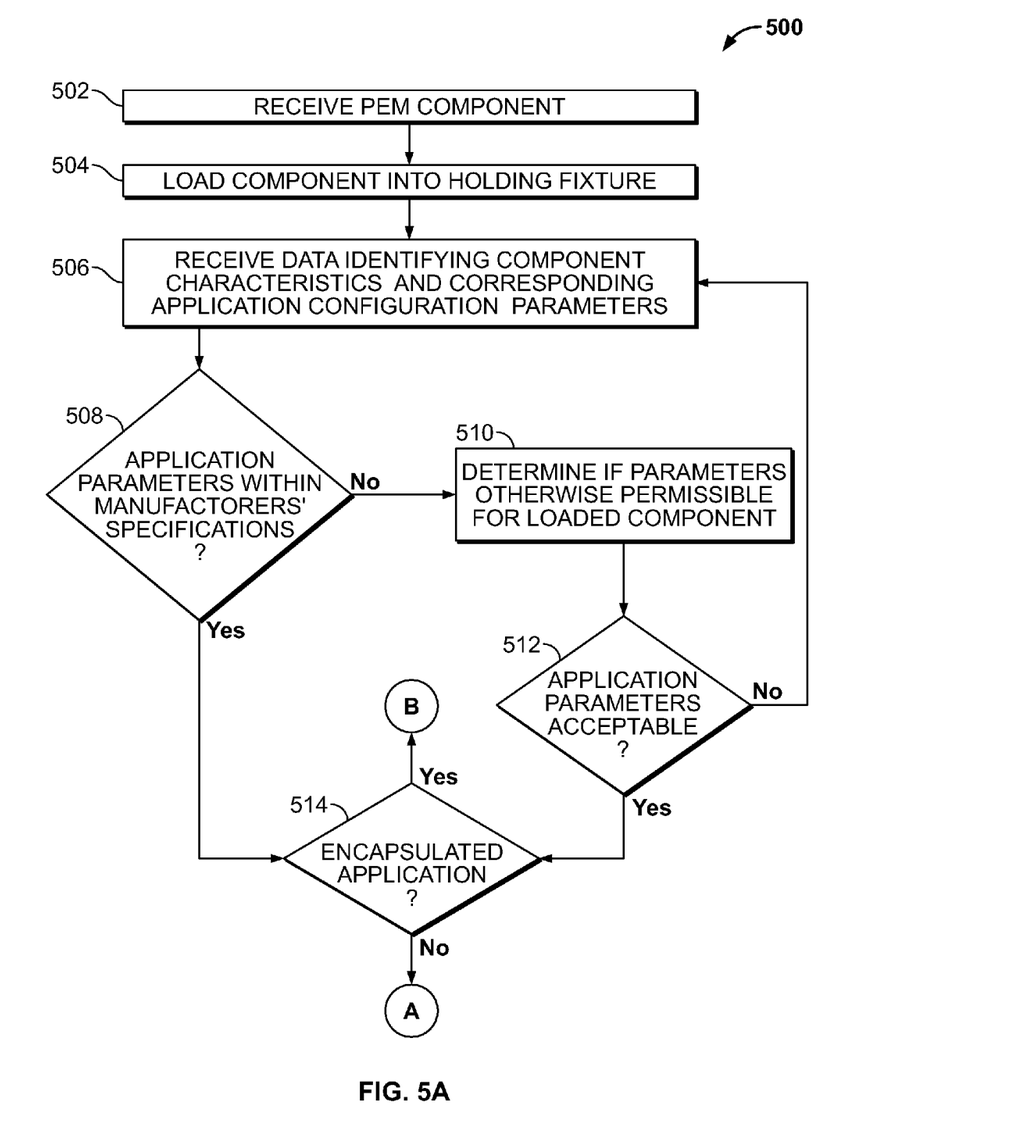
FIGS. 5A-5B is a flowchart illustrating the process of depositing and constructing the composite multilayer seal in accordance with preferred embodiments of the present invention.
Figure 5B:
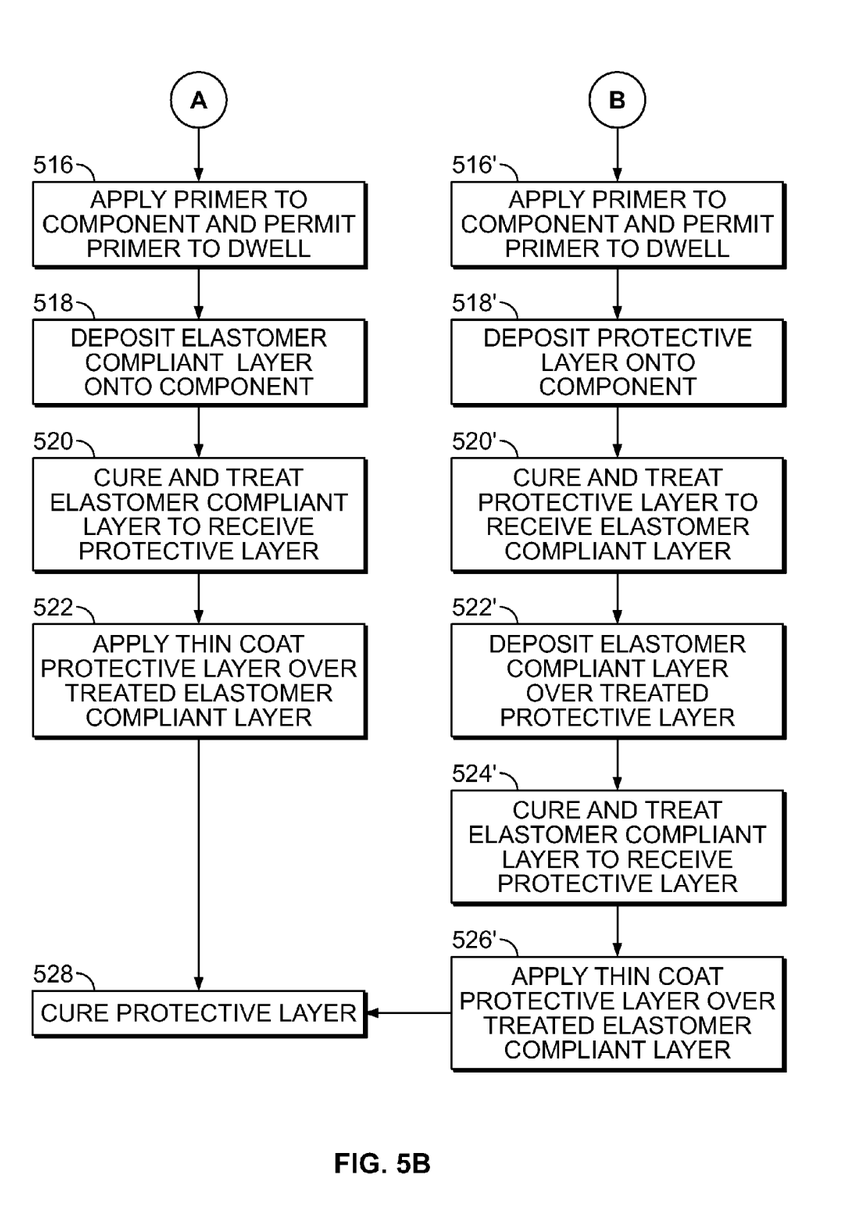

A method for forming composite seal 206 on bipolar plate 204 or MEA 202 of a PEM fuel cell is described in conjunction with process flow 500 of FIGS. 5A and 5B. Process flow 500 is initiated, at step 502, by receiving one of the two aforementioned manufactured components (i.e., a bipolar plate or an MEA) and loading, at step 504, said component into a holding fixture, a vacuum table, a magnetic chunk or any other suitable mechanism for stabilizing the manufactured fuel cell component. For purposes of brevity, the term "holding fixture" is used throughout to represent any one of the aforementioned mechanisms. Information pertaining to the manufactured fuel cell component and a corresponding application configuration parameter for depositing the constituents of composite seal 206 may then be received, at step 506, by a chemical depositing system (not shown) for executing the process of depositing and treating the constituents of composite seal 206. A robotic gantry may be used, for example, in depositing multilayer seal 206 along a desired periphery of manufactured fuel cell component, wherein the robotic gantry may be configured to accommodate a material delivery system for dispensing a liquid from of the required constituent.

Additionally, the depositing system may be configured to determine, at step 508, whether application parameters received are in compliance with a manufacturer's sealing specifications. For example, predefined manufacturer's specifications pertaining to required sealing criteria and the material composition of the manufactured fuel cell component may be input into or made electronically accessible to the depositing system for determining whether the application parameters received by the system, at step 506, would render the manufactured fuel cell component deficient for its intended use. Additionally, if application parameters received by the depositing system are determined to be outside of the manufacturer specifications or, alternatively, manufacturer specifications are not made available for the particular manufactured fuel cell component loaded into the holding fixture, the system may be further configured with a set of predefined checks to determine, at steps 510 and 512, if received application parameters are acceptable. If it is determined that the application parameters received are not acceptable for the particular manufactured fuel cell component loaded into the holding fixture, the depositing system may be configured to prompt for new application parameters, returning to step 506.

Upon receiving acceptable application parameters, the depositing system is cued to deposit a constituent of composite seal 206. However, prior to depositing a constituent of composite seal 206, a determination may first be made at step 514 as to whether an encapsulated or non-encapsulated application of composite seal 206 is desired.

If, at step 514, it is determined that a non-encapsulated application is desired, the manufactured fuel cell component loaded into the holding fixture may receive, at step 516, a primer along the defined periphery, which is permitted to dwell. Thereafter, at step 518, an elastomer compliant layer (i.e., silicone base layer 402a) is deposited along the primed periphery of the manufactured fuel cell component. After the elastomer compliant layer is deposited, it may be cured and treated, at step 520, using, for example, infra red radiation (IR), induction heating, radiation ultra violet (UV) or any other suitable curing method. In a preferred embodiment, the elastomer compliant layer may receive any one of a plurality of surface treatments to prepare the surface of the elastomer compliant layer prior to bonding of a thin protective layer (i.e., fluoroelastomer protective layer 402b), which is to be coated thereon at step 522. The surface of silicone base layer 402a, for example, may be plasma treated to increase bond strength and surface adhesion, wherein the foregoing is accomplished by converting the silicone surface to a carbonyl or carbonyl carboxyl crosslinked surface. In an alternative embodiment, the silicone surface may also be converted to an amino-carboxyl or amino-carbonyl crosslinked surface.

Alternatively, at step 514, a determination may be made that an encapsulated application is desired. Similar to the non-encapsulated application, the manufactured fuel cell component loaded into the holding fixture may first receive, at step 516', a primer along the defined periphery, which is permitted to dwell. Thereafter, at step 518', rather than receive an elastomer compliant base layer, a thin protective base layer (i.e., fluoroelastomer protective layer 404b) is applied along the primed periphery of the manufactured fuel cell component. The thin protective base layer is cured and treated, at step 520', before receiving, at step 522', an elastomer compliant core layer (i.e., fluoroelastomer protective layer 404a). The elastomer compliant core layer may receive, at step 524', any one of the previously described plurality of surface treatments to prepare the surface of the elastomer compliant layer prior to bonding of a thin top coat protective layer (i.e., fluoroelastomer protective layer 404b'), which is to be coated thereon at step 526'.

Applications of the thin coat protective layer, whether in the encapsulated or non-encapsulated embodiment, are preferably achieved through dispensing a solvated solution of a fluoroelastomer or fluoropolymer constituent. Coating methods may include spraying or flow coating of protective layer 402b and 404b/404b'. After the solvent has evaporate, the thin fluoroelastomer or fluoropolymer protective layer is subject to a final dwelling and curing stage, at step 528, to complete construction of composite seal 206 on the select manufactured fuel cell component.

The foregoing multilayer construction of composite seal 206 yields highly desirable attributes for PEM fuel cell applications and ensures the integrity of the seal over the entire periphery surface of primary fuel cell components. Additionally, composite seal 206 directly disposed along a particular periphery of bipolar plate 204 or MEA 202 allows for a thinner sealing construction to satisfy fuel cell stack tolerances, substantially increased resistivity to highly reactive chemical and thermal environments and a lower cost alternative to single compound gaskets.

The foregoing description is provided for illustrating the principles of the present invention and it is foreseeable that various modifications can be made by those skilled in the art without departing from the spirit and scope of the invention described herein. Therefore, one skilled in the art will appreciate that the present invention can be practiced by other than the described embodiments, which are presented for purposes of illustration and not by way of limitation, and the present invention is limited only by the claims that follow.

We claim:

1. A method of constructing a composite seal for use in fuel cell applications, said method comprising the steps of:
   loading a component of a fuel cell assembly into a holding fixture;
   applying a primer along a periphery of said component;
   dispensing an elastomer constituent directly onto said primed periphery of said component, said elastomer constituent forming a base layer of said composite seal; and
   applying a fluoroelastomer or fluoropolymer constituent over said elastomer constituent, said fluoroelastomer or fluoropolymer constituent coating a surface of said elastomer constituent to form a protective layer over said base layer.

2. The method of claim 1, further comprising plasma treating said surface of said elastomer constituent prior to applying said fluoroelastomer or fluoropolymer constituent.

3. The method of claim 1, wherein said elastomer constituent forming said base layer is comprised of a silicone-based constituent.

4. The method of claim 1, wherein said fluoroelastomer or fluoropolymer constituent forming said protective later is a solvated solution of a fluoroelastomer or fluoropolymer constituent.

5. A method of constructing a composite seal for use in fuel cell applications, said method comprising the steps of:
   loading a component of a fuel cell assembly into a holding fixture;
   applying a primer along a periphery of said component;
   dispensing a first layer of a fluoroelastomer or fluoropolymer constituent directly onto said primed periphery of said component;
   dispensing an elastomer constituent directly over said first layer of said fluoroelastomer or fluoropolymer constituent, said elastomer constituent forming a core layer of said composite seal; and
   applying a second layer of said fluoroelastomer or fluoropolymer constituent over said elastomer constituent, said second layer of said fluoroelastomer or fluoropolymer constituent coating a surface of said elastomer constituent to form a protective layer over and encapsulate said core layer.

6. The method of claim 5, wherein said elastomer constituent forming said core layer is comprised of a silicone-based constituent.

7. The method of claim 5, wherein said fluoroelastomer or fluoropolymer constituent is a solvated solution of a fluoroelastomer or fluoropolymer constituent.

* * * * *